United States Patent [19]

Oswald

[11] Patent Number: 4,600,456
[45] Date of Patent: Jul. 15, 1986

[54] METHOD AND APPARATUS FOR FORMING WOVEN ENDLESS TIRE REINFORCING BELTS

[75] Inventor: Richard W. Oswald, Madison, Conn.

[73] Assignee: Armstrong Rubber Company, New Haven, Conn.

[21] Appl. No.: 637,386

[22] Filed: Aug. 2, 1984

[51] Int. Cl.$^4$ ............................................. B65H 81/08
[52] U.S. Cl. .................................... 156/117; 156/177; 156/397; 156/440
[58] Field of Search .............. 156/177, 181, 175, 174, 156/117, 397, 425, 433, 441, 439, 440; 28/101, 103

[56] References Cited

U.S. PATENT DOCUMENTS

| | | | |
|---|---|---|---|
| 3,589,426 | 6/1971 | Varner | 156/361 |
| 3,761,341 | 9/1973 | Kimble | 156/177 |
| 4,448,621 | 5/1984 | Marsh et al. | 156/174 |

FOREIGN PATENT DOCUMENTS 3248264 7/1984 Fed. Rep. of Germany.
2134030 8/1984 United Kingdom.

Primary Examiner—Michael Ball
Attorney, Agent, or Firm—St. Onge, Steward, Johnston & Reens

[57] ABSTRACT

The object of the invention is to simplify the production of woven, endless tire reinforcing belts by enabling rapid, economical changes in belt size and simplified removal of the belts from the weaving apparatus.

The invention provides a method and apparatus for forming reinforcing belts which meet this objective by employing an endless weaving surface comprised of a flexible belt supported by means rotatable about spaced, parallel axes. By moving the supports apart, the weaving surface is tensioned for the weaving operation; and, by moving the supports toward one another, the weaving surface is relaxed to permit removal of the woven reinforcing belt. The circumference of successive reinforcing belts can easily be changed by changing the flexible belt comprising the weaving surface.

9 Claims, 3 Drawing Figures

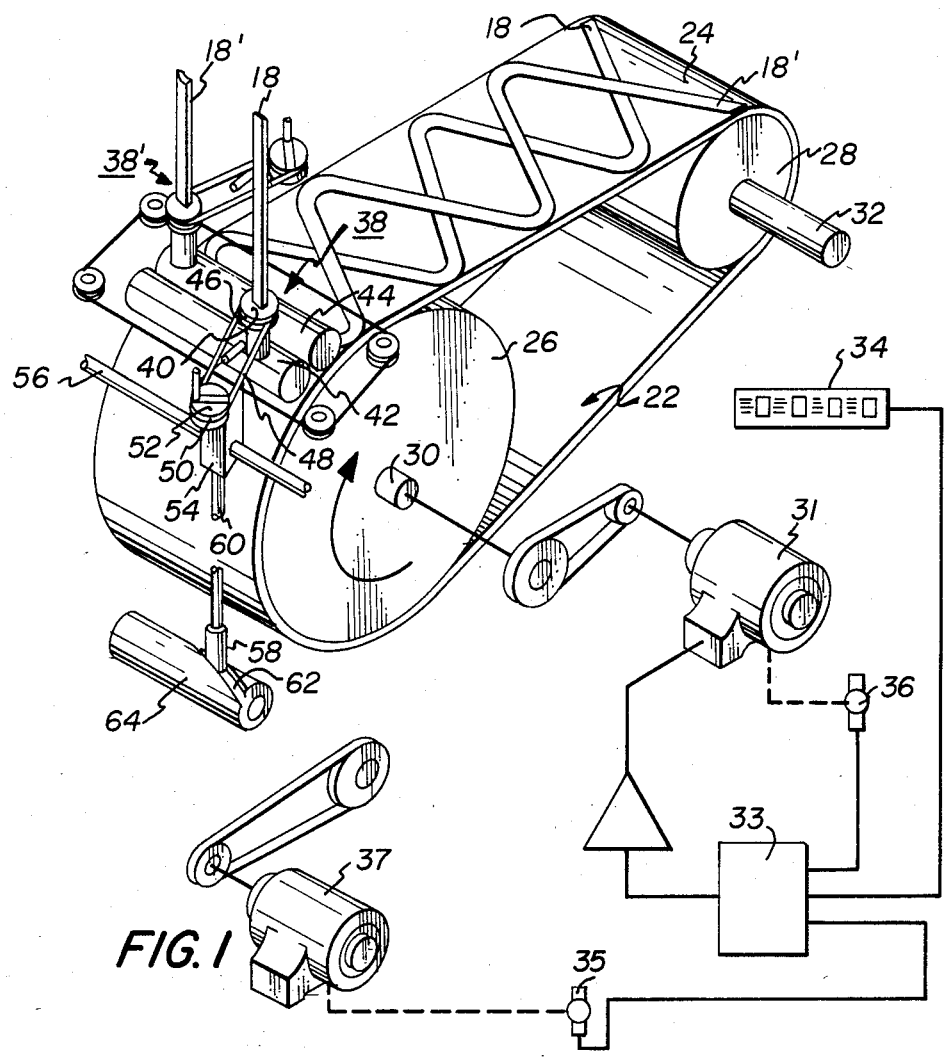
FIG. 1
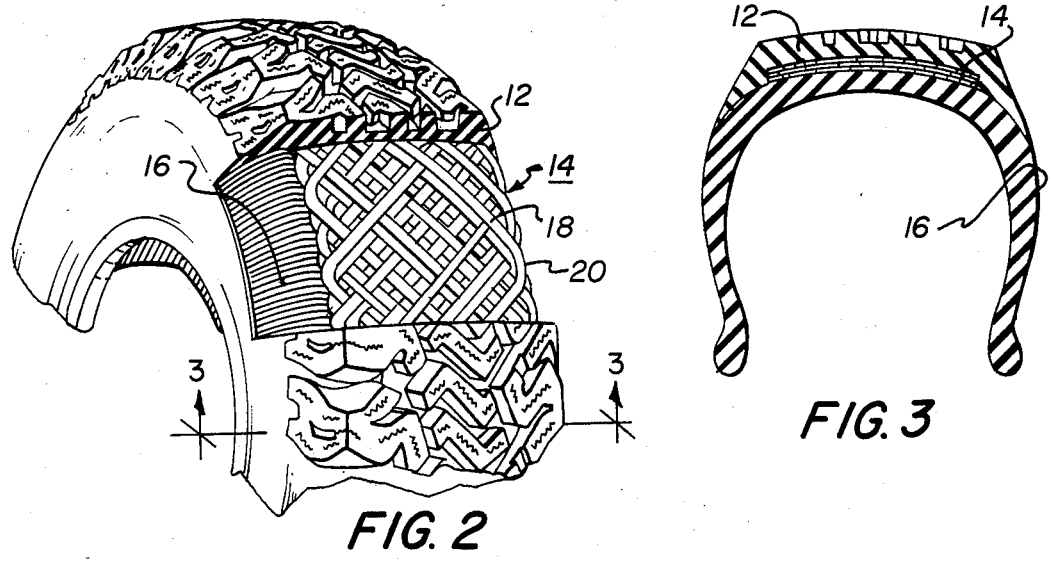
FIG. 2
FIG. 3

METHOD AND APPARATUS FOR FORMING WOVEN ENDLESS TIRE REINFORCING BELTS

DESCRIPTION

1. Technical Field

The present invention relates to simplified production of woven, endless tire reinforcement belts.

In recent years, endless woven tire reinforcement belts have been shown to provide a number of advantages over breaker belts of more conventional construction. According to the preferred mode of production, these endless belts are woven from coated continuous reinforcement material by laying it in an ordered zig-zag pattern on the surface of a forming drum of predetermined diameter.

It is an advantage of production that the woven belts are rapidly formed. Unfortunately, however, when it is desired to switch from production of reinforcement belts of one diameter to another, it has been necessary in practice to change the size of the drum and make a number of adjustments with regard to the means for feeding the reinforcement material to the drum. While expandable drums of various types are known, none of these drums, except those with complicated mechanical features, have been capable of automatically doffing or removing completed endless belts. Moreover, even for drums of fixed size, removal of the belts from the forming surface has required complicated mechanical constructions.

It would be desirable to have a method and apparatus which would simplify the production of woven, endless tire reinforcement belts by enabling rapid, economical changes in belt size and simplified removal of belts from the weaving apparatus.

2. Background Art

U.S. Pat. No. 3,589,426 to G. C. Varner describes the method of production of endless reinforcements for pneumatic tires by winding a continuous reinforcement cord in a generally zig-zag pattern. According to this disclosure, the reinforcement cords are preferably coated with rubber prior to laying them on a forming drum of fixed diameter. The cords are positioned across the width of the reinforcement belt being formed from one side to the other at an angle to the edges of the reinforcement with reversals at the edges. Lengths of cord between the reversals are interleaved with lengths disposed in an opposite direction along at least one line substantially parallel and intermediate the edges thereof. The perimeters of the reinforcement pattern within the endless reinforcement belt are defined in terms of a mathematical expression.

In U.S. Pat. No. 3,720,569, V. W. Kimball discloses an endless reinforcement of this type but which is made by weaving strips containing a plurality of cords instead of individual cords. The width of the strips are said to vary over a considerable range but will generally be between about one-half and two-and-one-half inches to facilitate convenient handling and reinforcement construction. Each strip will contain a plurality of cords spaced sufficiently to provide from about ten to about forty cords per inch of strip width. Utilization of continuous cord reinforcement in the form of strips of this type provides advantages over the use of single cords in terms of manufacturing efficiency and final belt characteristics.

In U.S. Pat. No. 3,706,623, N. E. Klein discloses a method and apparatus for removing an endless reinforcement belt from a cylindrical drum on which the belt is woven. According to the disclosure, radially-movable bands cover the surface of the drum over which the reinforcement belt is woven. Upon completion of the weaving operation, the bands are moved radially across the surface of the drum and carry the completed reinforcement belt off of the drum. The complex apparatus is said to be necessary because, even though collapsable drums had been used in the past, the reinforcement belts formed thereon still tended to adhere to portions of the drum surface even after the drum was collapsed. However, the complexity of this device greatly adds to the cost of the equipment and does not permit the formation of belts of more than one size on a given drum surface.

As a possible solution to the problem presented by Klein in the above-noted patent, he notes in his later patent, U.S. Pat. No. 3,761,340, that it is possible to employ radially-movable doffing bands on an adjustable drum surface to enable weaving and doffing belts of different circumferences. Unfortunately, the mechanism required to enable varying the drum size while still permitting radial movement of the doffing bands is even more complex than the apparatus of his earlier noted patent. Moreover, the degree to which the drum is adjustable is quite limited.

In U.S. Pat. No. 4,061,524, J. R. Tolan discloses an apparatus for forming continuous tire reinforcement belts of varying circumferences by permitting the use of forming drums of a plurality of sizes. According to the disclosure, the means for guiding the continuous coated cord reinforcement onto the drum are adjustable relative to the axis of rotation of the drum. The adjustability provided by this apparatus does enable the formation of continuous woven reinforcement belts in a wider variety of circumferences than was previously possible; however, the need to change winding drums and the need for complex mechanisms to adjust the position of the guide means, present complexities and more sources of potential malfunction than would be desired in a commercial, high-production setting.

DISCLOSURE OF INVENTION

In accordance with the present invention, there is provided a method and apparatus for forming woven endless tire reinforcement belts which enable rapid, economical changes in the size of reinforcement belts made and simplify removal of the reinforcement belts from the weaving apparatus.

The apparatus in its broad aspects comprises: an endless weaving surface; reinforcement guide means for supplying cord reinforcement to said endless weaving surface; and means comprising a plurality of support members rotatable about spaced parallel axes, for continuously moving said endless weaving surface in a closed loop about said axes. The apparatus preferably further includes means for moving at least one of said rotatable support members in a direction generally perpendicular to said axes to enable establishment of a desired degree of tension on said endless weaving surface during application of said cord reinforcement thereto and to enable simplified removal of a woven belt therefrom upon completion of a weaving operation.

The method, in its broad aspects, comprises the steps of: supporting an endless weaving surface, comprising a flexible belt, having a perimeter effective to produce a reinforcing belt of predetermined circumference and a width at least as great as that of the reinforcing belt to be woven, about a plurality of support members which are rotatable about spaced parallel axes; and laying coated continuous cord reinforcement on said endless weaving surface in a zig-zag pattern, said cord being positioned across said surface from one side to the other at an angle to the edges of the belt, with reversals at the edges and lengths of said cord reinforcement between the reversals being interleaved with lengths disposed at opposite angles, to thereby form a woven endless tire reinforcement belt. Preferably, the method will further comprise moving at least one of said support members in a direction transverse to said axes to slacken tension on said flexible belt and removing said reinforcement belt from said flexible belt.

BRIEF DESCRIPTION OF THE DRAWINGS

The invention will be better understood and its advantages will become more apparent when the following detailed description is read in light of the accompanying drawing wherein:

FIG. 1 is a schematic representation, in perspective, of the major component parts of the apparatus of the invention in operation;

FIG. 2 is a perspective view of a tire, partially broken away to show an endless tire reinforcing belt made according to the present invention in place in a tire; and FIG. 3 is a partial sectional view taken along line 3—3 in FIG. 2.

DETAILED DESCRIPTION OF THE INVENTION

Endless woven tire reinforcement belts of the type produced by the present invention find utility in virtually all vehicle tires. One of the widest uses is in passenger car tires of otherwise conventional radial and bias ply construction. The perspective drawing of FIG. 2 shows such a tire 10 with a portion of the tread 12 thoroughly removed showing the reinforcing belt 14 positioned on top of a radial ply tire carcass 16. Reference to FIG. 3 shows, in cross-section, the preferred arrangement of the reinforcing belt 14 with respect to the tread 12 and the tire carcass 16. The apparatus of the present invention, described below with reference to FIG. 1, simplifies the production of reinforcement belts of this type, for passenger tires of the type specifically shown as well as for trucks, tractors and a wide variety of other utilities.

It can be seen from FIG. 2 that the woven endless tire reinforcing belt 14 is composed of a number of coated continuous cord reinforcement strips 18 disposed in a zig-zag repeating pattern with succeeding lengths of the strip being displaced from each other. At the edges of the reinforcing belt are turns or reversals in the direction of winding such as shown at 20. The lengths of cord reinforcement between the reversals are interleaved with lengths of cords disposed at an opposite angle along at least one line substantially parallel to and intermediate the edges of the reinforcing belt. This interleaving relationship results in a woven structure, the production of which will be described in more detail below with regard to FIG. 1.

The individual continuous cord reinforcements 18 which are woven into the belt 14 are typically comprised of one or more tire cord strands embedded in or coated with a suitable rubber or other polymeric material. The cord may be of such materials as fiberglass, rayon, polyester, Aramid, nylon, cotton, steel, other metal or other similar types of cords. Most preferably, the coated continuous cord reinforcement will contain a plurality of parallel cords spaced evenly within a partial vulcanized rubber coating.

The continuous cord reinforcement will contain cords of the type and at the spacing effective to achieve the performance characteristics desired for intended conditions of use. For truck or tractor tire constructions, the cords are typically polyester, Aramid, glass or steel cord material in a reinforcement strip about ½ inch wide, which contains from six to twenty or more cords, preferably about eight or more cords across the width.

FIG. 1 schematically represents a preferred apparatus according to the present invention in operation during the early stages of formation of an endless tire reinforcing belt. As shown, the apparatus includes a flexible endless belt 22, which may be a multiple ply belt of reinforced rubber or of stainless steel having a thickness of from about 0.032 to 0.035 inches. The outer surface 24 of the endless flexible belt 22 comprises an endless weaving surface upon which the coated continuous cord reinforcement strips 18 are laid to form the reinforcing belt. The inner surface of the endless flexible belt 22 may have means such as a "V"-shaped projection (not shown) to mate with a complimentary notch in support or guide members to assure tracking.

To support the endless weaving surface carried on the flexible endless belt 22, means comprising a plurality of support members, here shown as cylindrical members 26 and 28 are provided. If desired, a greater number of support members can be provided. All of the support members are rotatable about spaced parallel axes, here shown as defined by the centers of shafts 30 and 32. Due to the buildup of tension during winding, means should be provided for securely locking the shafts at the desired spacing. According to the embodiment shown in FIG. 1, the support member 26 is the driven member with support member 28 being driven by it due to the endless flexible belt 22 being tensioned thereover during operation. Member 26 is driven by means operatively engaged with shaft 30 to cause rotation in the direction shown by the arrow and movement of the belt being formed in a generally left-to-right direction in the drawing. Suitable drive means including a variable speed DC motor 31, appropriate gearing, and a phase lock loop control system, as will be explained in more detail below, are provided.

By providing an endless weaving surface according to the present invention which is flexible and supported by two movable support members, it is possible to rapidly modify production to accommodate planned or unplanned demand for reinforcing belts of differing circumferences. Thus, in the middle of a production run for a belt of a given circumference, the production can be rapidly changed as a short term need arises for belts of a different circumference. Because this reinforcing belt weaving step in the overall tire manufacturing process does to some extent control overall production, the need for such rapid changeover often saves time in multiples of that actually saved by the quick changeover. Such quick changeovers have not heretofore been possible where it has been necessary to not only change the size of the forming drum, but then to also make further adjustments as to the positioning of the means for feeding the continuous cord reinforcement to the drum.

Another advantage of employing an endless weaving surface driven by movable support members is the simplified belt removal or doffing operation. Means are provided according to the present invention for moving one or all of the support members apart so as to provide a suitable tension on the flexible belt 22 for the weaving operation and also for moving the support members toward each other upon completion of the weaving of a reinforcing belt to facilitate simplified removal of the reinforcing belt from the endless weaving surface. Production of reinforcing belts on current equipment requires the use of a suitable release layer between the winding drum and the reinforcing belt. The use of this release layer can be omitted according to the invention.

The embodiment shown in FIG. 1 is capable of laying two coated continuous cord reinforcement strips on the endless weaving surface 24 simultaneously. This is currently the preferred mode of operation, however, the same principles apply regardless of the number of cord reinforcement strips employed, whether it be one or a greater plurality.

Each of the strips, 18 and 18' are supplied to the endless weaving surface 24 by independent reinforcement guide means shown generally as 38 and 38' because each of these means functions in the same manner, except for its movement being in mirrored relation to the other, the operation of only reinforcement guide means 38 will be described. The like parts on the other means will be the same with like parts performing like functions having the reference numeral distinguished in the drawing by the use of prime numbers. Both of these reinforcement guide means can be simply and effectively moved in the requisite timed relationship to the movement of the weaving surface by operable engagement through suitable gearing with variable speed DC motor 37 which is synchronized with motor 31 for the endless weaving surface. With regard to reinforcement guide means 38, this engagement is schematically indicated in the drawing. The ability to maintain the motor drive 37 and its associated gearing as well as the reinforcement guide means 38 in fixed position while enabling the production of endless tire reinforcement belts of a wide variety of circumferences, is a significant advantage in terms of the simplicity of equipment design and the resultant enhancement of reliability provided thereby.

The relative speeds of motors 31 and 37 are synchronized by phase lock loop controller 33 and associated circuitry, or other suitable servo motor control system. The phase lock loop controller will preferably be of the high gain high accuracy type and can be set to a desired ratio of speeds for the two motors by suitable means such as a digital thumbwheel switch 34. In the preferred embodiment, the speed of motor 37 will be monitored by encoder 35 which provides a reference signal to the phase lock loop controller 33 and the speed of motor 31 will be monitored by encoder 36 which provides a feedback signal to the controller 33. The corrected drum drive speed is then provided to motor 31 by the controller 33.

In operation, an individual coated continuous reinforcement strip 18 is fed through a suitably-shaped slot in alignment means 40 and then between counter-rotating rollers 42 and 44 which are operable to lay the strip under pressure against endless weaving surface 24. The slot in member 44 receiving the strip 18 is maintained in its proper orientation with its length perpendicular to the direction of travel of the continuous weaving surface 24, by alignment control means which include an annular groove 46 on member 40 for receiving a control band 48 which is received in an annular groove 50 in control means 52 mounted on carriage 54. The control mechanism 52 is understood in the art and forms no part of the present invention.

The movement of the reinforcement guide means 38 back and forth in a direction generally transverse to the direction of movement of the endless weaving surface 24 is achieved by moving carriage 54 back and forth about guide rod 56. Cam follower 58 is attached to carriage 54 by means of connecting rod 60 and tracks the path of slide cam 62 in the cylindrical camming means 64 which is driven through operable engagement with motor 37.

The pattern on the coated continuous cord reinforcement strip within the endless tire reinforcing belt being formed is achieved by timing the movement of reinforcement guide means 38 with the movement of the endless weaving surface 24 as described above. The cord reinforcement is applied to the endless weaving surface in a zig-zag pattern, being positioned across the surface from one side to the other. The angle of the cord reinforcement strip to the edges of the belt is reversed and the lengths of the cord reinforcement between reversals are interleaved with lengths disposed at an opposite angle along at least one line substantially parallel to and intermediate the edges of the belt. The parameters of the belt are related according to empiracle relationships, which are generally described in the following manner:

$$\frac{C \cdot \tan A}{2 \cdot W} = \frac{EPI \cdot C \cdot D \cdot \sin A}{P \cdot M \pm 1} = GR$$

wherein C is the circumference of the reinforcing belt, A is the smaller angle between the cord reinforcement and the edge of the reinforcing belt, W is the width of the reinforcing belt measured perpendicular to the edges, EPI is the number of cord reinforcements per inch measured perpendicular to the cord lengths, P is an integer and equal to one plus the total number of interleaving lines parallel to and intermediate the edges of the reinforcing belt, M and D are two integers having no common factor and which render $$\frac{P \cdot M \pm 1}{D}$$

an integer with D being less than P, and D and P have no common factor, GR is the number of repeating cycles of the cord reinforcement edge and back to the same edge for each circumference of the reinforcing belt. This is, however, at best an approximation and does not hold true for all desired patterns when wound on the apparatus of the invention. There are several factors which make mathematical predictability difficult with this apparatus. Among these are, the changing effective radius and effective velocity of the forming surface. However, with the formula as a guide, the desired pattern can be obtained reproducably through limited trial and error.

The invention will be described in greater detail with reference to the following example which is intended to illustrate the best mode for carrying out the invention.

EXAMPLE

A reinforcing belt for a radial ply tire is made on an apparatus as shown in FIG. 1 employing the following procedure. The inner circumference of the endless reinforcing belt for a truck tire is about 129 inches and the width is about 7 inches. The coated continuous reinforcement strip has a cross-sectional width of about ½ inch and a cross-sectional thickness of about 0.080 inch. Each of two reinforcement strips employed in weaving the belt have six uniformily spaced, parallel 3,000/3 cord, i.e. there are 3 yarns of 3,000 denier each twisted together to form cord construction. The strips are laid on a reinforced rubber endless belt which comprises the weaving surface with the linear speed of movement of the surface being about 45 feet per minute. To achieve the zig-zag winding, the reinforcement guide means are reciprocated back and forth across the intended width of the belt. This movement of the reinforcement guide means back and forth is continued as the movement of the endless weaving surface is continued through a total of 85 complete circumferential passes of the weaving surface. Upon completion of the winding operation, a non-driven cylindrical support member is moved toward a driven cylindrical support member to slacken the tension on the flexible belt, which forms the weaving surface, to thereby permit easy removal of the completed reinforcing belt from the weaving surface. The endless reinforcing belt is then applied as a breaker belt to a radial ply tire carcass of the 10 R 22 size, and tread and sidewall forming rubber stock is then placed over the breaker belt. The resulting assembly is then molded under heat and pressure and vulcanized to form a completed tire.

The above description is for the purpose of teaching the person of ordinary skill in the art how to practice the present invention. This description is not intended to describe in detail each and every obvious modification of the invention. Applicant's do intend, however, to include all such obvious modifications and variations within the scope of the invention which is defined by the following claims.

I claim:

1. Apparatus for forming a woven endless tire reinforcing belt by laying coated continuous cord reinforcement on an endless weaving surface in a zig-zag pattern to weave said belt thereon, comprising: an endless weaving surface; reinforcement guide means for supplying cord reinforcement to said endless weaving surface; means comprising a plurality of support members rotatable about spaced parallel axes, for continuously moving said endless weaving surface in a closed loop about said axes; and means for reciprocating said guide means in timed relationship with said support members along a path parallel to said axes to effect the laying of said cord reinforcement on said surface in a zig-zag pattern.

2. Apparatus according to claim 1 wherein said endless weaving surface comprises a steel belt.

3. Apparatus according to claim 1 further including: means for moving at least one of said rotatable support members in a direction generally perpendicular to said axes to enable establishment of a desired degree of tension on said endless weaving surface during application of said cord reinforcement thereto and to enable simplified removal of a woven belt therefrom upon completion.

4. Apparatus according to claim 3 which further includes timing means including a phase lock loop controller for synchronizing the continuous movement of said rotatable support members with the reciprocation of said guide means.

5. Apparatus according to claim 3 which includes a plurality of reinforcement guide means.

6. Apparatus for forming a woven endless tire reinforcing belt comprising: an endless weaving surface comprising a flexible belt having a width greater than that desired for the reinforcing belt and a perimeter equal to that desired for the reinforcing belt; reinforcement guide means for supplying coated continuous cord reinforcement to said endless weaving surface; a plurality of cylindrical support members, rotatable about spaced parallel axes, for moving said endless weaving surface in a closed loop about said axes in timed relationship with said guide means; and means for moving at least one of said cylindrical support members in a direction transverse to said axes to enable establishment of a desired degree of tension on said endless weaving surface during application of said cord reinforcement thereto and to enable simplified removal of a woven belt therefrom upon completion.

7. Apparatus for weaving an endless tire reinforcing belt of a desired predetermined circumference from coated continuous cord reinforcement, comprising: an endless weaving surface comprising a belt having a perimeter effective to produce a reinforcing belt of the desired predetermined circumference; reinforcement guide means for supplying coated continuous cord reinforcement to said endless weaving surface in a zig-zag pattern, being positioned across said surface from one side to the other at an angle to the edges of the belt being formed with reversals at the edges and lengths of said cord reinforcement between reversals being interleaved with lengths disposed at an opposite angle along at least one line substantially parallel to and intermediate the edges of said belt, the parameters of said belt being approximately $$\frac{C \cdot \tan A}{2 \cdot W} = \frac{EPI \cdot C \cdot D \cdot \sin A}{P \cdot M \pm 1} = GR$$

wherein C is the circumference of the reinforcing belt, A is the smaller angle between the cord reinforcement and the edge of the reinforcing belt, W is the width of the reinforcement belt measured perpendicular to the edges, EPI is the number of cord reinforcements per inch measured perpendicular to the cord lengths, P is an integer and equal to one plus the total number of interleaving lines parallel to and intermediate the edges of the reinforcing belt, M and D are two integers having no common factor and which render $$\frac{P \cdot M \pm 1}{D}$$

are an integer with D being less than P, and D and P have no common factor, GR is the number of repeating cycles of the cord reinforcement edge and back to the same edge for each circumference of the reinforcing belt; a plurality of cylindrical support members, rotatable about spaced parallel axes, for moving said endless weaving surface in a closed loop about said axes in timed relation with said guide means to achieve said parameters of said belt; means for moving at least one of said cylindrical support members in a direction transverse to said axes to enable establishment of a desired degree of tension on said endless weaving surface during application of said cord reinforcement thereto and to enable simplified removal of a woven belt therefrom upon completion.

8. A method for weaving an endless tire reinforcement belt of a predetermined circumference from coated continuous cord reinforcement, comprising: supporting an endless weaving surface, comprising a flexible belt having a perimeter effective to produce a reinforcing belt of the predetermined circumference and a width greater than that of the reinforcing belt to be woven, about a plurality of support members which are rotatable about spaced parallel axes; and laying coated continuous cord reinforcement on said endless weaving surface in a zig-zag pattern, said cord being positioned across said surface from one side to the other, at an angle to the edges of the belt with reversals at the edges, and lengths of said cord reinforcement between reversals being interleaved with lengths disposed at an opposite angle along at least one line substantially parallel to and intermediate the edges of said belt being formed, to thereby form a woven endless tire reinforcing belt.

9. A method for weaving an endless tire reinforcing belt of a predetermined circumference from coated continuous cord reinforcement on an endless weaving surface and removing said reinforcing belt from said surface, comprising: supporting an endless weaving surface, comprising a flexible belt having a perimeter effective to produce a reinforcing belt of predetermined circumference and a width greater than that of the reinforcing belt to be woven, about a plurality of support members which are rotatable about spaced parallel axes; laying coated continuous cord on said endless weaving surface in a zig-zag pattern, said cord being positioned in timed relation with said support members across said surface from one side to the other, at an angle to the edges of the belt with reversals at the edges, and lengths of said cord reinforcement between reversals being interleaved with lengths disposed at an opposite angle along at least one line substantially parallel to and intermediate the edges of said belt being formed, to thereby form a woven endless tire reinforcing belt; moving at least one of said support members in a direction transverse to said axes to slacken tension on said flexible belt; and removing said reinforcing belt from said flexible belt.

* * * * *